Sept. 21, 1954

H. A. MUSK ET AL 2,689,941

WIDE SHIFT REACTANCE MODULATOR

Filed Nov. 14, 1951

INVENTOR
Henry A. Musk
and John G. Hammond
BY
F. E. Browder
ATTORNEY

Patented Sept. 21, 1954 2,689,941

UNITED STATES PATENT OFFICE 2,689,941

WIDE SHIFT REACTANCE MODULATOR

Henry A. Musk, Glen Burnie, and John G. Hammond, Catonsville, Md., assignors to Westinghouse Electric Corporation, East Pittsburgh, Pa., a corporation of Pennsylvania Application November 14, 1951, Serial No. 256,314

3 Claims. (Cl. 332—28)

Our invention relates to modulation of electrical currents, and, more particularly, to reactance modulators for causing frequency modulation in radio frequency oscillations.

In the prior art of which we are aware, reactance modulators have been built, employing phase shift networks, for changing the phase of oscillations which are fed back to the oscillator. However, the phase shift networks employed in the prior art have been capable of producing a phase shift which is only an approximation of the desired 90 degrees. These phase shift networks also produce phase shifts which are frequency sensitive. The reactance modulators of the prior art therefore produce a substantial undesirable amplitude modulation in addition to the desired frequency modulation.

It is accordingly an object of our invention to provide an improved reactance modulator system.

Another object of our invention is to provide a frequency modulator, the output of which is free from amplitude modulations.

Another object of our invention is to provide a reactance modulator system in which the reactance current supplied to the oscillator is purely reactive.

Still another object of our invention is to provide a reactance modulator system in which a 90 degree phase shift is obtained independently of frequency.

An ancillary object of our invention is to provide a phase shift network capable of producing a phase shift of exactly 90 degrees.

The novel features which we consider characteristic of our invention are set forth with more particularity in the appended claims. The invention, however, with respect to both the organization and the operation thereof, together with other objects and advantages may be best understood from the following description of specific embodiments when read in connection with the accompanying drawing, in which:

Figure 3:
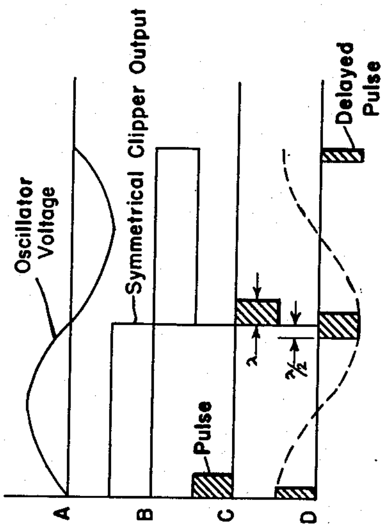
Fig. 3 is a graphical showing of the phase relationships of electrical currents in different parts of the circuit shown in Fig. 2.
Figure 1:
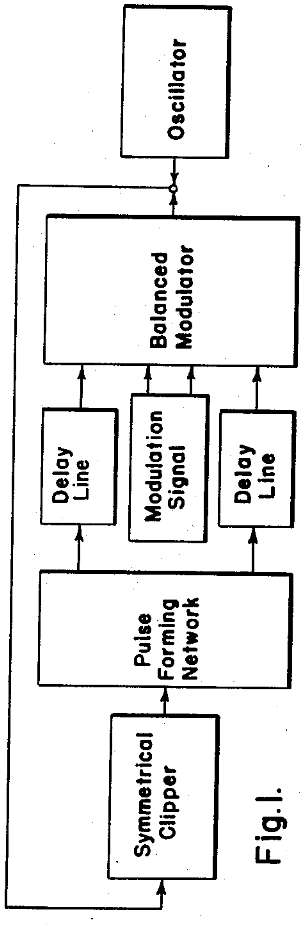
Figure 1 is a schematic showing of apparatus embodying our invention, in which the elements are shown in block form for purposes of clarity.
Figure 2:
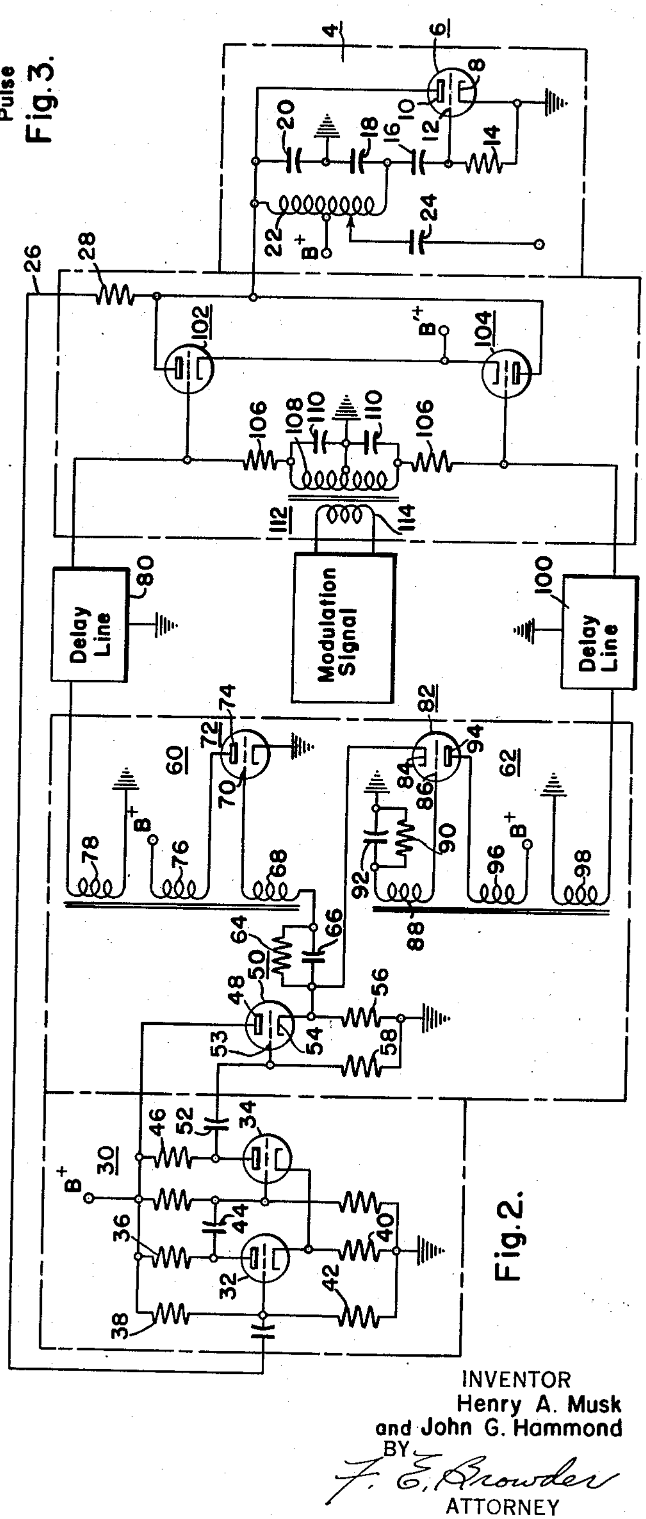
Fig. 2 is a schematic showing of apparatus embodying our invention, in which the delay line and the source of modulation signal potential are shown in block form.

In accordance with our invention, we provide an oscillator circuit 4 comprising an oscillator tube 6 having a cathode 8, an anode 10 and a grid 12. Connections are provided between the grid 12 of the oscillator tube 6 and the cathode 8 of that tube through a grid bias resistor 14. The grid 12 of the oscillator tube 6 is also connected through a capacitance 16 to a pair of capacitances 18, 20 in series, these last two capacitances 18, 20 being connected in parallel with an inductance 22. The opposite end of the inductance 22 from that which is connected to the first mentioned capacitance 16 is connected to the anode 10 of the oscillator tube 6. Connections are provided near the center of the inductance 22 for applying a positive potential. This potential is preferably about 250 volts. Connected to the inductance 22 is an output connection having therein an output condenser 24. A feedback connection 26 is provided which is connected to the anode 10 of the oscillator tube 6, and which has therein a variable resistance 28 for controlling the current therethrough. The feedback connection 26 from the oscillator 4 is connected so as to supply current to a symmetrical clipper circuit 30. The clipper circuit 30 shown in the drawing comprises a master tube 32 and a slave tube 34, each having therein an anode, a cathode, and a grid. The anode of the master tube 32 is connected through a first master output resistance 36 and a grid bias resistance 38 to the master grid. The master cathode is connected through a cathode follower resistance 40 to ground, and through a second grid bias resistor 42, in series with the follower resistance 40, to the master grid. The cathodes of the master and slave tubes 32, 34 are connected together. The grid of the slave tube 34 is connected through a capacitance 44 to the anode of the master tube 32. The anode of the slave tube 34 is connected through an output resistor 46 to the anode 48 of an amplifier tube 50, and through a capacitance 52 to the grid of the amplifier tube 50. The cathode 54 of the amplifier tube 50 is connected through a cathode follower resistance 56 to ground, and the grid 53 of the amplifier tube 50 is connected through a grid bias resistance 58 to ground. In the embodiment shown in the drawing, energy is derived from the amplifier tube 50 by means of a cathode follower arrangement and supplied to a pair of pulse forming networks 60, 62.

The cathode 54 of the amplifier tube 50 is connected through a resistance 64 and capacitance 66 in parallel, and through a transformer coil 68 in series relation to the grid 70 of a first pulse forming triode 72. The anode 74 of the first pulse tube 72 is connected through a secondary transformer winding 76 to a source of positive potential. A tertiary transformer winding 78 is located so that its flux lines engage the primary transformer winding 68. The tertiary transformer winding 76 is connected to ground at one end and to a first delay line 80 at the other end.

A second pulse forming network is provided, comprising a second pulse forming triode 82, the cathode 84 of which is connected to the cathode 54 of the amplifier tube 50. The grid 86 of the second pulse tube 82 is connected through a primary transformer winding 88 in series with a resistance 90 and capacitance 92 in parallel to ground. The anode 94 of the second pulse tube 82 is connected through a secondary transformer winding 96 to a source of positive potential. A tertiary transformer winding 98 is located so that it engages the flux lines of the primary and the secondary windings 88, 96 of the second pulse-forming network. The tertiary winding 98 of the second pulse forming network is connected to a second delay line 100. The second delay line 100, like the first delay line, is designated to produce a delay equal to a 90 degree phase shift of the waves supplied thereto. The output of the first and second delay lines 80, 100 are connected to the grids of first and second modulator tubes 102, 104, respectively, and each is connected through a resistance 106 in series with an inductance 108 and capacitance 110, in parallel to ground. The last mentioned inductance 108 comprises the secondary of a modulation transformer 112, the primary winding 114 of the modulation transformer 112 being adapted to receive a modulation signal. The cathodes of the first and second modulator tubes 102, 104 are interconnected. The anodes of the first and second modulator tubes 102, 104 are connected to the anode 10 of the oscillator tube 6, so as to supply feedback oscillations thereto.

We thus provide an oscillator 4 having a feedback to a symmetrical clipper circuit 30. The output from the oscillator 4 is a sine wave, as shown in Fig. 3–A. The clipper circuit 30 receives the sine wave produced by the oscillator 4, and produces in response thereto a square wave, as shown in Fig. 3–B. The output from the clipper circuit 30 is supplied through an amplifier tube 50 to two pulse forming networks, one of which is adapted to respond to the positive half cycle, and the other of which is adapted to respond to the negative half cycle.

In the first pulse forming network, the oscillations from the cathode 54 of the amplifier tube 50 cause the grid 70 of the first pulse tube 72 to become positive. This causes the first pulse tube 72 to conduct. When the first pulse tube 72 conducts, a current is caused to flow through the secondary winding 76 of the first pulse network transformer. When a current flows through the secondary winding 76, this induces an additional potential in the primary winding 68. The potential induced in the primary winding 68 by the current in the secondary winding 76 causes the current of the first pulse tube 72 to increase. Thus the current through the first pulse tube 72 builds up very rapidly until the grid 70 becomes sufficiently positive that it starts to draw a grid current of sufficient magnitude that the cycle reverses. The output of the first and second pulse forming networks is a sharp pulse of short duration and large amplitude, as shown by the graph of Fig. 3–C.

The pulses from the pulse forming network are supplied to delay lines 80, 100 which may be any of several types well-known in the art for producing a delay equal to a 90 degree phase shift. It is understood, of course, that in using the term "delay line," we do not mean that there must necessarily be an actual delay in the propagation of the oscillations. Instead, it is sufficient if a 90 degree phase change is produced.

In the balanced modulator 112, the output of the first and second delay lines is amplitude modulated. A balanced modulator is employed in the preferred embodiment of our invention, because a single-ended system would give only half the frequency swing of a balanced modulator. The balanced modulator 112 can supply current with 90 degrees ahead or behind this source of voltage. The output of the balanced modulator 112 is thus a wave which is 90 degrees out of phase with the oscillations produced by the oscillator 4, regardless of the frequency of the oscillator 4 and these oscillations, produced by the modulator 112, are amplitude modulated without any corresponding frequency modulations. The output of the modulator 112 is supplied to the oscillator 4 so as to vary the effective reactance of the reactance elements 18, 20, 22 of the oscillator 4. Since the oscillations supplied to the oscillator 4 by the modulator 112 are exactly 90 degrees out of phase with the oscillations produced by the oscillator 4, the modulated oscillations cause the oscillator 4 to change its frequency of oscillations without changing the amplitude of its oscillations.

In accordance with another embodiment of our invention, where the required frequency deviation is not too great, as for example, in a situation where the required frequency deviation is less than 5 per cent, the required delay in the reactive pulse may be obtained by unbalancing the clipper circuit 30. When this is done, we have found that the delay lines 80, 100 may be omitted, and the pulse forming networks connected directly to the modulator 112.

Although we have shown and described specific embodiments of our invention, we are aware that other modifications thereof are possible. Our invention, therefore, is not to be restricted except insofar as is necessitated by the prior art and the spirit of the invention.

We claim as our invention:

1. A reactance modulator comprising an oscillator circuit, a clipper circuit, a feedback connection from said oscillator circuit to said clipper circuit, a pulse forming network adapted to receive an output pulse from said clipper circuit, an amplitude modulator, a delay line, said modulator being connected through said delay line to the output of said pulse forming network, connections between said modulator and said oscillator circuit for impressing the output current of said modulator on said oscillator circuit.

2. A reactance modulator comprising an oscillator circuit, a clipper circuit connected to said oscillator circuit so as to receive electrical oscillations from said oscillator, a pair of pulse forming networks connected and adapted to receive output pulses from said clipper circuit, a first delay line connected so as to receive oscillations from a first of said pulse forming networks, and a second delay line connected so as to receive oscillations from a second of said pulse forming networks, a balanced amplitude modulator, means for applying a modulation signal to said modulator, a means for conveying energy from said first and said second delay lines to said amplitude modulator, connections for conveying output pulses from said modulator to said oscillator.

3. A reactance modulator comprising an oscillator circuit, a clipper circuit connected to said oscillator circuit so as to receive electrical oscillations from said oscillator, said clipper circuit comprising a master tube and a slave tube, each having an anode, a cathode and a grid, the grid of said slave tube being connected to the anode of said master tube, a pair of pulse forming networks connected and adapted to receive output pulses from said clipper circuit, a first delay line connected so as to receive oscillations from a first of said pulse forming networks, and a second delay line connected so as to receive oscillations from a second of said pulse forming networks, a balanced amplitude modulator, means for applying a modulation signal to said modulator, means for conveying energy from said first and said second delay lines to said amplitude modulator, connections for conveying output pulses from said modulator to said oscillator.

References Cited in the file of this patent

UNITED STATES PATENTS

| Number | Name | Date |
|---|---|---|
| 2,331,821 | Winlund | Oct. 12, 1943 |
| 2,355,433 | Goldstine | Aug. 8, 1944 |